United States Patent
Shellenberger

(10) Patent No.: US 7,032,911 B1
(45) Date of Patent: Apr. 25, 2006

(54) STROLLER HANDLE EXTENDER

(76) Inventor: Barbara Shellenberger, 435 Lincolnway Dr., York, PA (US) 17404

( * ) Notice: Subject to any disclaimer, the term of this patent is extended or adjusted under 35 U.S.C. 154(b) by 50 days.

(21) Appl. No.: 10/937,699

(22) Filed: Sep. 9, 2004

(51) Int. Cl.
*B62B 3/00* (2006.01)

(52) U.S. Cl. ............................. 280/47.38; 280/47.371; 280/47.4; 280/655.1

(58) Field of Classification Search ............ 280/47.38, 280/47.371, 47.4; 74/551.3
See application file for complete search history.

(56) References Cited

U.S. PATENT DOCUMENTS

| | | | | |
|---|---|---|---|---|
| 5,516,142 A | * | 5/1996 | Hartan | 280/642 |
| 5,669,625 A | * | 9/1997 | Jane Cabagnero | 280/647 |
| 5,845,917 A | * | 12/1998 | Huang | 280/47.371 |
| 6,098,492 A | * | 8/2000 | Juchniewicz et al. | 74/551.3 |
| 6,099,022 A | * | 8/2000 | Pring | 280/648 |
| 6,101,678 A | * | 8/2000 | Malloy et al. | 16/438 |
| 6,428,034 B1 | * | 8/2002 | Bost | 280/650 |

* cited by examiner

*Primary Examiner*—Christopher P. Ellis
*Assistant Examiner*—Cynthia F. Collado
(74) *Attorney, Agent, or Firm*—Goldstein Law Offices, P.C.

(57) ABSTRACT

A stroller handle extender for an existing stroller, for increasing the effective length of the push handles thereof, so that a taller individual may comfortably stand upright while grasping the push handles and pushing a child in the stroller, and thereby avoid straining the back, neck, and shoulder muscles. The stroller handle extender has two elongated extender handles, and has two clamping assemblies, each having an upper bracket and a lower bracket. Each clamping assembly is simultaneously and selectively attachable to one of the push handles and to one of the extender handles by simultaneously sandwiching both the push handle and the extender handle between the upper bracket and the lower bracket, by extending two bolts through the upper bracket and the lower bracket, and by threading each of the bolts into a different wing nut.

5 Claims, 2 Drawing Sheets

STROLLER HANDLE EXTENDER

BACKGROUND OF THE INVENTION

1. Field of the Invention

The invention generally relates to an extension device, and in particular relates to a stroller handle extender for an existing stroller, for enabling taller individuals to comfortably stand upright while pushing a child in the stroller.

2. Description of the Related Art

Strollers and baby carriages are wheeled devices used by parents for conveniently transporting small children and infants between various locations without having to carry the child. These wheeled devices generally have a handle extending therefrom which is grasped within the hands of a parent while rolling the devices upon their wheels. Although strollers and carriages are extremely useful for transporting children and infants, they have a notable disadvantage. In particular, the push handles that extend from existing strollers and carriages are generally sized for use by individuals having "average height". Therefore, a taller individual who is pushing one of said devices by its push handles must stoop or bend in order to reach the push handles, which is uncomfortable and may strain the back, neck, and shoulder muscles of the individual, especially after an extended period of time. Accordingly, there is need for a stroller handle extender for an existing stroller, for increasing the effective length of the push handles thereof, so that a taller individual may comfortably stand upright while grasping the push handles and pushing a child in the stroller, and thereby avoid straining the back, neck, and shoulder muscles.

A variety of handle extension assemblies have been created for use in conjunction with an existing wheeled vehicle. For example, U.S. Pat. No. 5,845,917 to Huang appears to show a telescoping handle comprised of a pair of inner and outer tubes to provide an extension for people of differing heights pushing a stroller. Additionally, U.S. Pat. No. 6,098,492 to Juchniewicz appears to show a handle extension device used for a cart such as a stroller. Moreover, U.S. Pat. No. 6,101,678 to Malloy appears to show an adjustable handle adapted to be set for different heights for use in conjunction with a small vehicle.

While these devices may be suitable for the particular purpose employed, or for general use, they would not be as suitable for the purposes of the present invention as disclosed hereafter.

SUMMARY OF THE INVENTION

It is an object of the invention to provide a stroller handle extender for an existing stroller, for increasing the effective length of the push handles thereof, so that a taller individual may comfortably stand upright while grasping the push handles and pushing a child in the stroller, and thereby avoid straining the back, neck, and shoulder muscles. Accordingly, the stroller handle extender has two elongated extender handles, and has two clamps for selectively attaching each of the extender handles to a different one of the push handles of the stroller, thereby making it easier for a taller individual to comfortably stand upright while grasping the push handles and pushing a child in the stroller, and thereby avoid straining the back, neck, and shoulder muscles.

It is another object of the invention to provide a stroller handle extender which is easily installed onto the push handles of a stroller. Accordingly, each clamp has an upper bracket and a lower bracket. Each clamp is simultaneously and selectively attachable to one of the push handles and to one of the extender handles of the stroller handle extender by simultaneously sandwiching both the push handle and the extender handle between the upper bracket and the lower bracket, by extending two bolts through the upper bracket and the lower bracket, and by threading each of the bolts into a different wing nut, thereby providing a stroller handle extender which is easily installed onto the push handles of a stroller.

It is yet another object of the invention to provide a stroller handle extender which is adjustable in length. Accordingly, each of the extender handles of the stroller handle extender may be clamped at various positions along its length, thereby providing a stroller handle extender which is adjustable in length.

Further objects of the invention will become apparent in the detailed description of the invention that follows.

The invention is a stroller handle extender for an existing stroller, for increasing the effective length of the push handles thereof, so that a taller individual may comfortably stand upright while grasping the push handles and pushing a child in the stroller, and thereby avoid straining the back, neck, and shoulder muscles. The stroller handle extender has two elongated extender handles, and has two clamping assemblies, each having an upper bracket and a lower bracket. Each clamping assembly is simultaneously and selectively attachable to one of the push handles and to one of the extender handles by simultaneously sandwiching both the push handle and the extender handle between the upper bracket and the lower bracket, by extending two bolts through the upper bracket and the lower bracket, and by threading each of the bolts into a different wing nut.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
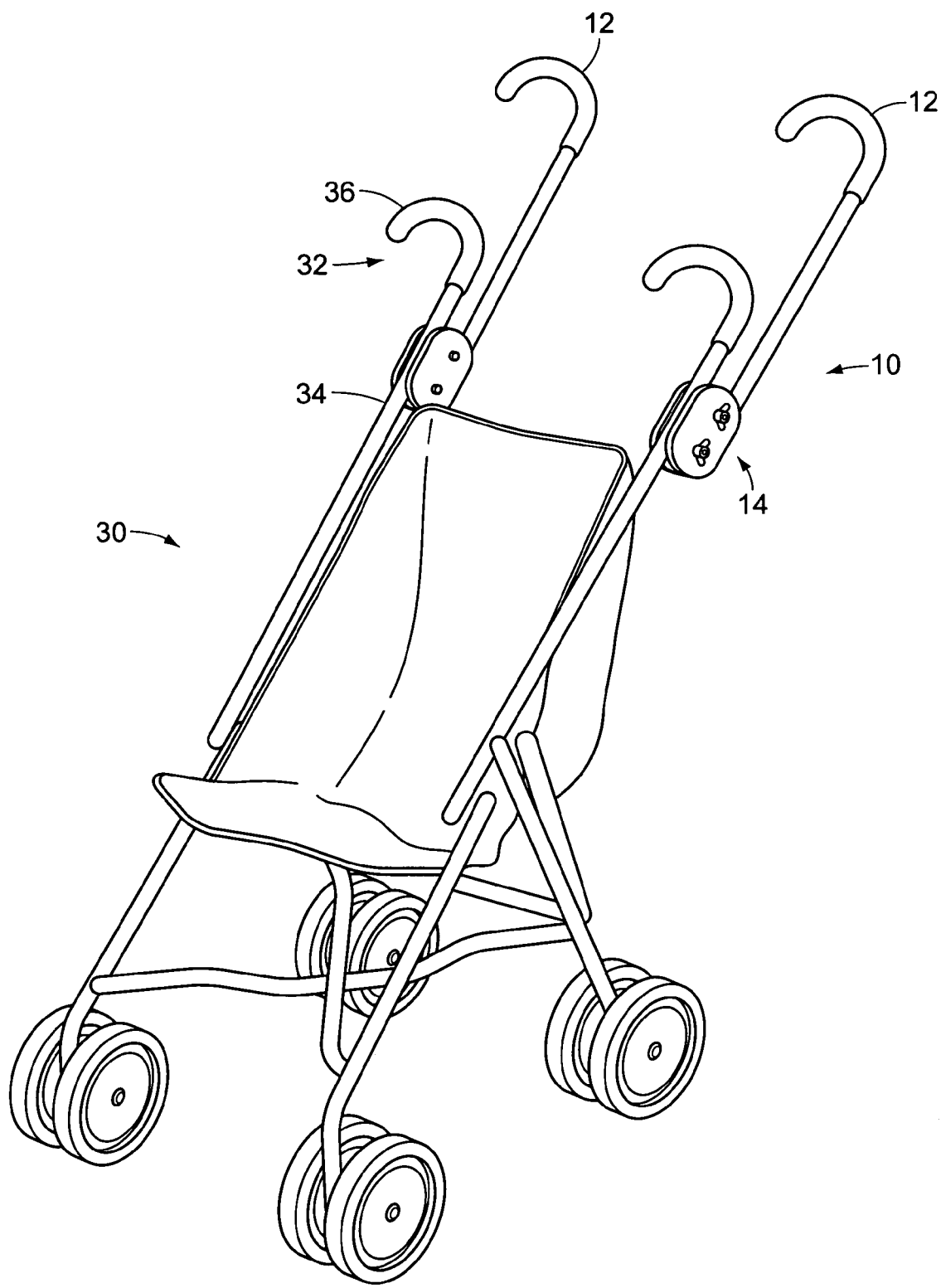
FIG. 1 is a perspective view of a stroller handle extender, after selective attachment to the push handles of an existing stroller.
Figure 2:
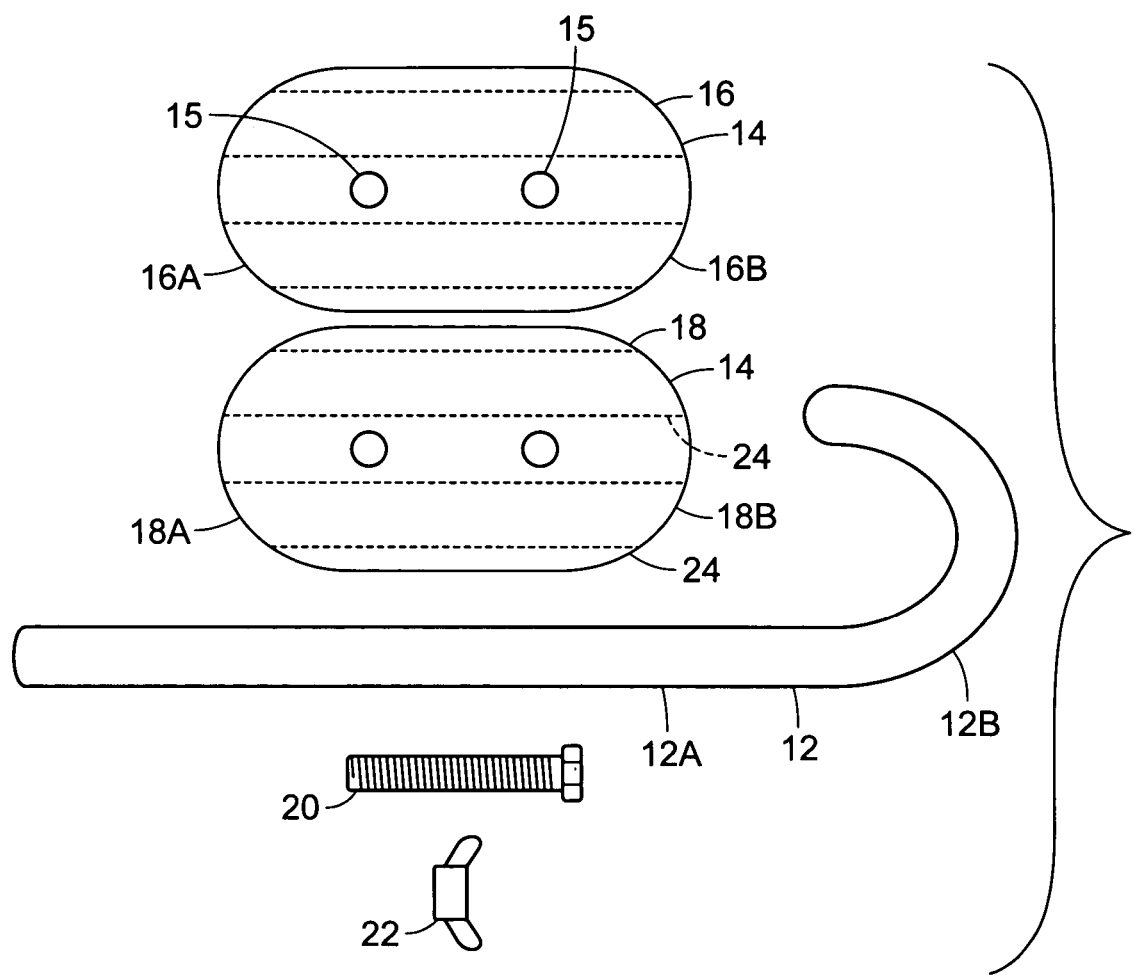
FIG. 2 is an elevational view of the components of the stroller handle extender, prior to selective attachment to the push handles of the stroller.

FIG. 1 illustrates a stroller handle extender 10, after selective attachment to each of the push handles 32 of an existing stroller 30. Each push handle 32 has a substantially straight stem 34 and a U-shaped handle portion 36. The stroller handle extender 10 increases the effective length of the stems 34 of each of the push handles 32, so that a taller individual may comfortably stand upright while grasping the push handles 32 and pushing a child in the stroller 30, and thereby avoids straining the back, neck, and shoulder muscles. The stroller handle extender 10 comprises two elongated extender handles 12 and two clamping assemblies 14. Each of the extender handles 12 and each of the clamping assemblies 14 is substantially identical. FIG. 2 illustrates one of the extender handles 12 and the components of one of the clamping assemblies 14. Each of the extender handles 12 has a straight portion 12A and a U-shaped portion 12B extending therefrom. Each clamping assembly 14 has a substantially oval upper bracket 16 and a substantially oval lower bracket 18. Each clamping assembly 14 is provided with two bolts 20 and two wing nuts 22, for selectively securing the upper bracket 16 to the lower bracket 18, as will be described. Each clamping assembly 14 is simultaneously and selectively attachable to the stem 34 of one of the push handles 32 of the stroller 30 and to the straight portion 12A one of the extender handles 12, and thereby increases the effective length of the push handle 32.

Figure 3:
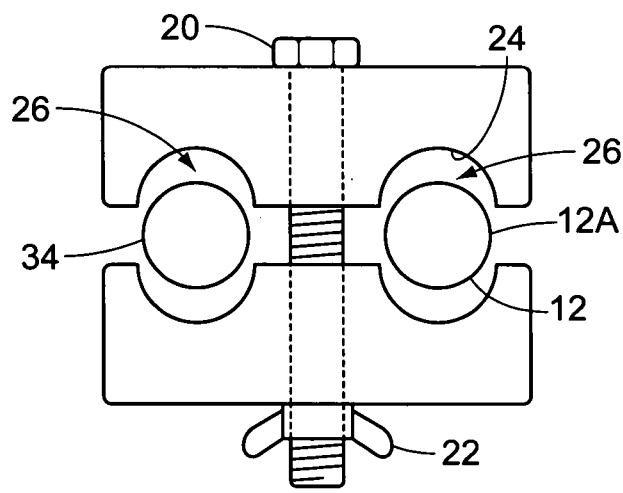
FIG. 3 is a side view of an extender handle of the stroller handle extender, after selective attachment to a push handle of the stroller with a clamping assembly.

The upper bracket 16 has a first end 16A, a second end 16B, and two spatially separated arcuate grooves 24 extending from the first end 16A to the second end 16B. In like fashion, the lower bracket 18 has a first end 18A, a second end 18B, and two spatially separated arcuate grooves 24 extending from the first end 18A to the second end 18B. Each of the brackets, 16 and 18, has two spatially separated bolt holes 15 extending therethrough. The two bolt holes 15 are positioned between the two arcuate grooves 24 of each of the brackets, 16 and 18. When the upper bracket 16 is selectively positioned over the lower bracket 18, and the bolt holes 15 of the brackets, 16 and 18, are aligned with one another, the arcuate grooves 24 of the upper bracket 16 and the lower bracket 18 together define two substantially cylindrical channels 26, as may be seen in FIG. 3. One of these channels 26 is used to selectively engage the stem 34 of one of the push handles 32, and the other channel 26 is used to selectively engage the straight portion 12A of one of the extender handles 12.

In use, a user attaches one of the extender handles 12 to the stem 34 of each of the push handles 32 of the stroller 30 using one of the clamping assemblies 14. In particular, the user attaches one of the extender handles 12 to the stem 34 of one of the push handles 32 by simultaneously sandwiching the stem 34 and the straight portion 12A of one of the extender handles 12 between the arcuate grooves 24 of both the upper bracket 16 and the lower bracket 18, aligning the bolt holes 15 of the upper bracket 16 with the bolt holes 15 of the lower bracket 18, extending a bolt 20 through each of the bolt holes 15, and threading a wing nut 22 onto the threaded end of each of the bolts 20. The user repeats the process to attach the other extender handle 12 to the stem 34 of the other push handle 32. The user grasps the U-shaped portion 12B of each of the extender handles 12 while pushing the stroller 30.

Each of the extender handles 12 of the stroller handle extender 10 may be clamped at various positions along the straight portion 12A of the extender handle 12, thereby providing a stroller handle extender 10 which is adjustable in length to fit the needs of users having different heights.

The extender handles 12 are preferably approximately sixteen inches long and five inches in width. Each of the brackets, 16 and 18, is preferably approximately four inches in length, three inches wide, and three-quarter inches thick. The brackets, 16 and 18, are preferably constructed from a durable plastic.

In conclusion, herein is presented a stroller handle extender for an existing stroller, for enabling taller individuals to comfortably stand upright while pushing a child in the stroller. The invention is illustrated by example in the drawing figures, and throughout the written description. It should be understood that numerous variations are possible, while adhering to the inventive concept. Such variations are contemplated as being a part of the present invention.

What is claimed is:

1. A stroller handle extender for an existing stroller having two push handles, each having a stem, for increasing the effective length of the stems of the push handles so that a taller individual may comfortably stand upright while grasping the push handles and pushing a child in the stroller, and thereby avoid straining the back, neck, and shoulder muscles, comprising:

two elongated extender handles, each having a straight portion and a U-shaped portion extending therefrom; and two clamping assemblies, each having:

an upper bracket and a lower bracket, each bracket having a first end, a second end, and two spatially separated arcuate grooves extending from the first end to the second end, each bracket further having two bolt holes extending therethrough, said bolt holes positioned between the two arcuate grooves of each of the brackets, wherein when the upper bracket is selectively positioned over the lower bracket, and the bolt holes of the brackets are aligned with one another, the arcuate grooves of the upper bracket and the lower bracket together define two substantially cylindrical channels, one channel for selectively engaging the stem of one of the push handles, and the other channel for simultaneously selectively engaging the straight portion of one of the extender handles; and two bolts and two wing nuts, each bolt having a threaded end, said bolts for selective extension through each of the bolt holes, said wing nuts for selective threading onto the threaded end of each of the bolts when selectively securing the upper bracket to the lower bracket.

2. The stroller handle extender as recited in claim 1, wherein the brackets are substantially oval.

3. The stroller handle extender as recited in claim 2, wherein the brackets are constructed from plastic.

4. A method, for use by a taller individual in conjunction with an existing stroller having two push handles, each having a stem, for increasing the effective length of the stems of the push handles, so that the taller individual may comfortably stand upright while grasping the push handles and pushing a child in the stroller, and thereby avoid straining the back, neck, and shoulder muscles, said method using a stroller handle extender having two extender handles, each having a straight portion and a U-shaped portion, said stroller handle extender further having two clamping assemblies, each having an upper bracket and a lower bracket, each bracket having a first end, a second end, and two spatially separated arcuate grooves extending from the first end to the second end, each bracket further having two bolt holes positioned between the two arcuate grooves of each of the brackets, wherein the arcuate grooves of the upper bracket and the lower bracket together define two channels, one channel for selectively engaging the stem of one of the push handles, and the other channel for simultaneously selectively engaging the straight portion of one of the extender handles, said clamping assemblies further having two bolts and two wing nuts, each bolt having a threaded end, said method comprising the steps of:

attaching the first of the two extender handles to the stem of the first of the two push handles by:

sandwiching said stem and the straight portion of said extender handle between the arcuate grooves of the upper bracket and the lower bracket;

aligning the bolt holes of the upper bracket with the bolt holes of the lower bracket;

extending a bolt through each of the bolt holes; and threading a wing nut onto the threaded end of each of the bolts; and attaching the second of the two extender handles to the stem of the second push handle by a substantially identical process as was used for attaching the first of the two extender handles to the stem of the first of the two push handles.

5. The method for increasing the effective length of the stems of the push handles of an existing stroller as recited in claim 4, wherein the step of threading a wing nut onto the threaded end of each of the bolts is preceded by the step of extending the straight portion of the extender handles within the channels to an extent which will allow the taller individual to comfortably grasp the U-shaped portion of the extender handle while pushing the stroller, thereby providing a stroller handle extender which is adjustable in length to fit the needs of the taller individual.

\* \* \* \* \*